(12) United States Patent
Preston

(10) Patent No.: US 9,242,590 B2
(45) Date of Patent: Jan. 26, 2016

(54) TIE DOWN STRAP HAVING ELASTIC SECTION

(71) Applicant: Thomas J. Preston, Glen Ellyn, IL (US)

(72) Inventor: Thomas J. Preston, Glen Ellyn, IL (US)

( * ) Notice: Subject to any disclaimer, the term of this patent is extended or adjusted under 35 U.S.C. 154(b) by 55 days.

(21) Appl. No.: 13/907,641

(22) Filed: May 31, 2013

(65) Prior Publication Data

US 2014/0150214 A1 Jun. 5, 2014

Related U.S. Application Data

(60) Provisional application No. 61/654,871, filed on Jun. 2, 2012.

(51) Int. Cl.
*A44B 13/00* (2006.01)
*B60P 7/06* (2006.01)
*B60P 7/08* (2006.01)

(52) U.S. Cl.
CPC ............. *B60P 7/06* (2013.01); *B60P 7/0823* (2013.01); *Y10T 24/14* (2015.01); *Y10T 24/1406* (2015.01); *Y10T 24/2708* (2015.01); *Y10T 24/316* (2015.01); *Y10T 24/47* (2015.01)

(58) Field of Classification Search
CPC .................................................. B65D 2313/02
USPC .............. 24/300, 301, 265 R, 442, 306, 16 R; 224/901.4
See application file for complete search history.

(56) References Cited

U.S. PATENT DOCUMENTS

| | | | | |
|---|---|---|---|---|
| 620,217 | A | * | 2/1899 | Blakesley ........................ 2/321 |
| 3,390,680 | A | * | 7/1968 | Marcum ...................... 606/203 |
| 4,273,130 | A | * | 6/1981 | Simpson ...................... 606/203 |
| 5,402,557 | A | | 4/1995 | Dalen |
| 5,623,750 | A | | 4/1997 | Nasin et al. |
| 5,752,633 | A | * | 5/1998 | Antaki ........................ 224/222 |
| 5,957,141 | A | * | 9/1999 | Elkins .......................... 132/273 |

* cited by examiner

*Primary Examiner* — Robert J Sandy
*Assistant Examiner* — Michael Lee
(74) *Attorney, Agent, or Firm* — Erickson Law Group, PC

(57) ABSTRACT

A tie down strap includes one or more inelastic strap section with an elastic section connecting the inelastic sections. An end of a first inelastic strap section includes a buckle or ring. The first inelastic strap section includes a first hook and loop arrangement and the second inelastic strap section includes a second hook and loop arrangement engageable to the first hook and loop arrangement to hold the strap in a loop configuration to secure an object. The inelastic strap sections are flat, multi-ply straps and the elastic section comprises two spaced-apart elastic cords, each cord stitched or otherwise secured at opposite ends to the respective first and second inelastic strap sections. The elastic cords can be composed of woven, flattened BUNGEE cord material.

10 Claims, 3 Drawing Sheets

TIE DOWN STRAP HAVING ELASTIC SECTION

This application claims the benefit of U.S. Provisional Application 61/654,871, filed Jun. 2, 2012.

BACKGROUND

The invention relates to tie down straps for securing objects, such as ladders to roof racks of vehicles or on truck racks.

Inelastic straps while easy to adjust for secured object size, have a tendency to come loose by vibration or shifting of the secured objects. Elastic straps such as BUNGEE brand elastic cords resist vibration induced loosening of object shifting, but are more difficult to adjust in length to match the size of the load. The elastic cord must sometimes be stretched to extreme amounts to tightly hold an object.

The present inventor has recognized that it would be desirable to provide a tie down strap or securing strap that was easy to adjust in length and which resisted loosening under vibration or shifting objects being secured.

SUMMARY

The exemplary embodiment of the invention provides a strap arrangement that is easy to adjust in length but includes a resilient section that retained secured objects tightly secured under the influence of vibration or shifting of the objects secured.

The exemplary embodiment provides one or more inelastic strap sections with an elastic section connected to the one or more inelastic strap sections. An end of a first inelastic section includes a buckle or ring. The first inelastic strap section includes a first connector and the second inelastic strap section includes a second connector, wherein the first and second connectors are engageable to hold the strap in a loop configuration to secure an object therein. Advantageously, the first and second connectors comprise a hook and loop (VELCRO) arrangement. Advantageously, the inelastic strap sections are flat, multi-ply strap sections and the elastic section comprises two spaced-apart elastic cords stitched or otherwise secured at opposite ends to the respective first and second inelastic strap sections. The elastic cords can be composed of woven, flattened BUNGEE brand elastic cord material.

Numerous other advantages and features of the present invention will become readily apparent from the following detailed description of the invention and the embodiments thereof, from the claims and from the accompanying drawings.

DETAILED DESCRIPTION

Figure 1:
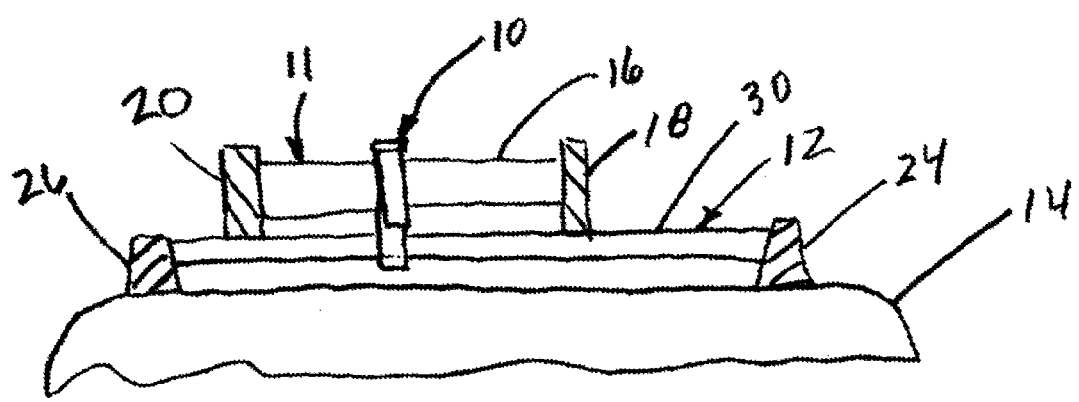
FIG. 1 is a fragmentary sectional view of a ladder connected to a vehicle roof rack using a tie-down strap of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a tie down strap 10 that is shown in use securing a ladder 11 to a roof rack 12 of a vehicle. The ladder 11 includes a step 16 attached to two side supports 18, 20. The roof rack 12 includes side rails 24, 26 which are connected by a crossmember 30. The tie down strap 10 can be wrapped around the step 16 and the crossmember 30 to hold the ladder 11 to the roof rack 12.

Figure 2:
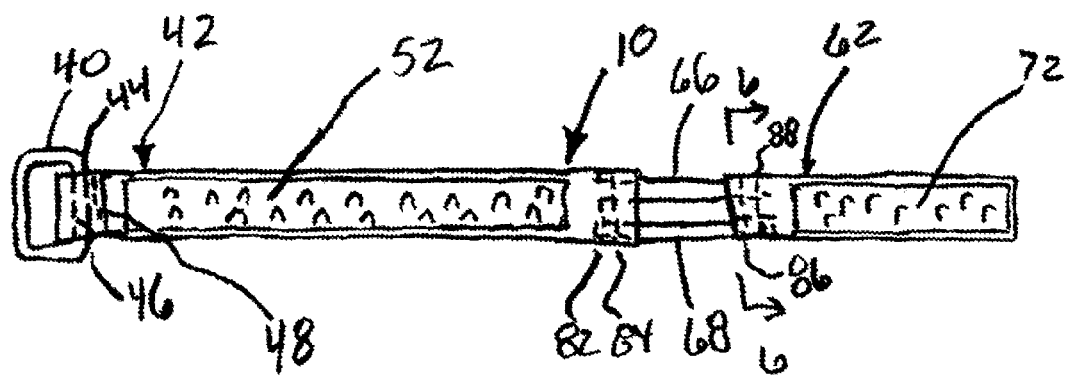
FIG. 2 is a front side view of the tie down strap of FIG. 1.

FIG. 2 illustrates the tie down strap 10 according to an exemplary embodiment of the invention. The strap 10 includes a rectangular buckle or ring 40 which is attached to a section 42 of the strap 10. In this regard an end portion 44 of the strap section 42 is folded around one leg of the ring 40 and stitched back onto itself along a stitching line 48. The strap section 42 is comprised of a front ply 42a and back ply 42b, each ply made of an inelastic woven fabric such as nylon, cotton or polyester material. The two plies can be stitched together or otherwise attached together. A fabric layer 52 can be attached by stitching or other means of attachment to the outside of the front ply 42a. This fabric layer 52 comprises random or organized loops for engagement by hooks of a hook and loop fastener arrangement.

The section 42 is connected to a section 62 by a pair of spaced-apart elastic elements 66, 68. The elastic elements 66, 68 can be woven elastic tubular members, preferably having a substantially flat cross-section. The elastic elements can be composed of material of the commercial product known as BUNGEE brand elastic cord. Other types of elastic element 66, 68 such as rubber strips or round cross-section cords are encompassed by the invention.

The section 62 is similar in cross-sectional construction to the section 42 in that it includes front and back plies 62a, 62b stitched together or otherwise attached together. A fabric section 72 comprising random or organized hooks covers some of our all of the section 62 on a front side thereof. The hooks of the section 72 are configured to fasten to the loops of the fabric section 52 by a hook-and-loop surface fastener engagement (VELCRO) when pressed together. It is also encompassed by the invention that the fabric section 52 has hooks and the fabric section 72 has loops or that both sections have a mixture of hooks and loops. It is also encompassed by the invention that other means of attaching end regions of the strap together to form a closed loop are used.

Figure 4:
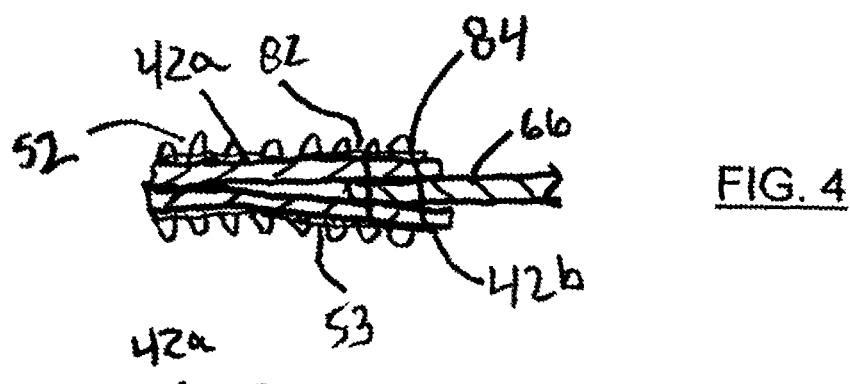
FIG. 4 is a sectional view taken generally along line 4-4 of FIG. 3.
Figure 5:
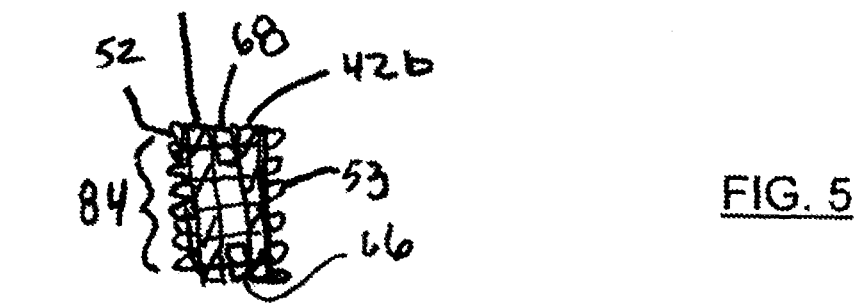
FIG. 5 is a sectional view taken generally along line 5-5 of FIG. 3.
Figure 6:
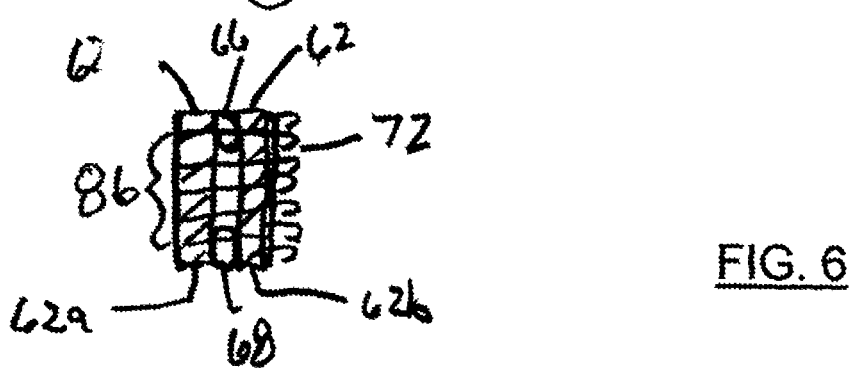
FIG. 6 is a sectional view taken generally along line 6-6 of FIG. 2.

As shown in FIGS. 4-6 the elastic elements 66, 60 are partially inserted between the plies 42a, 42b and between the plies 62a, 62b and end portions of the elastic elements 66, 68 are integrated and connected into the sections 42, 62 by stitching lines 82, 84 which extend through the plies 42a, 42b and the elements 66, 68 and stitching lines 86, 88 which extend through the plies 62a, 62b and the elements 66, 68. Additional stitching can be done in the direction of lines 82, 84, 86, 88 and in the perpendicular direction (not shown) along the length direction of the elements 66, 68, to ruggedly connect the elements 66, 68 to the sections 42, 62.

Figure 3:
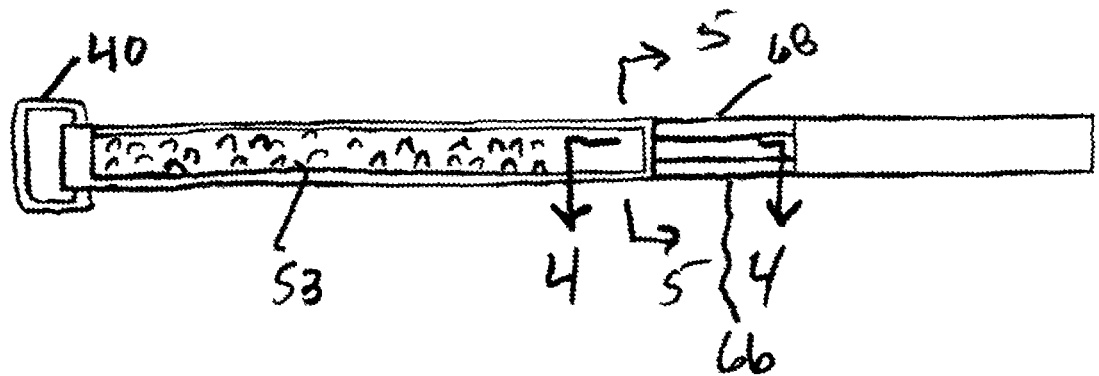
FIG. 3 is a backside view of the tie down strap of FIG. 2.

FIG. 3 illustrates a back side of the strap wherein a further fabric section 53 of random or organized loops can be applied.

The hooks of the section 72 are configured to fasten to the loops of the fabric section 53 by a hook-and-loop surface fastener engagement (VELCRO) when pressed together. It is also encompassed by the invention that the fabric section 53 has hooks and the fabric section 72 has loops or that both sections have a mixture of hooks and loops. It is also encompassed by the invention that other means of attaching end regions of the strap together to form a closed loop are used.

Figure 7:
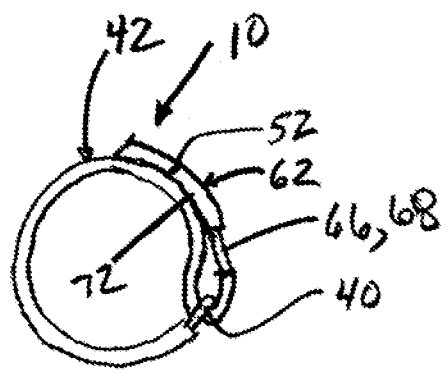
FIG. 7 is a plan view of the strap of FIG. 1 in a first engagement orientation.
Figure 8:
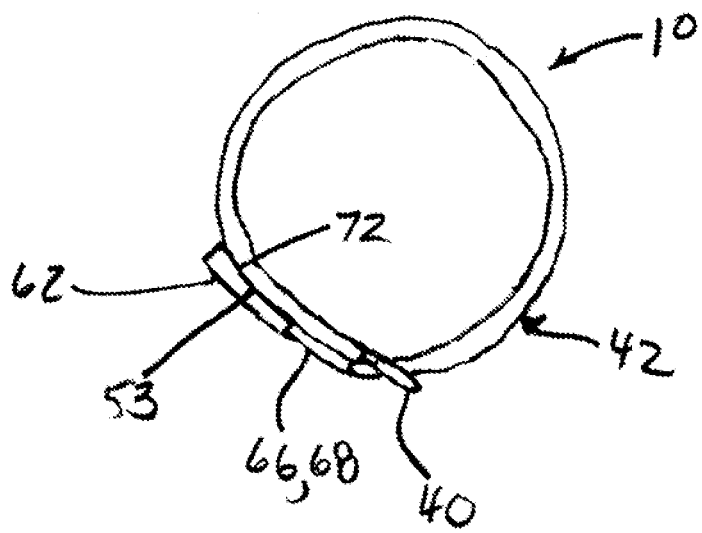
FIG. 8 is a plan view of the strap of FIG. 1 in a second engagement orientation.

FIG. 7 illustrates the strap in a first engaged configuration around an object (not shown) wherein the section 62 is pulled through the ring 40 and pulled tight and folded back on itself and the fabric section 72 is fastened to the fabric section 52 using a hook and loop engagement (VELCRO) when pressed together. FIG. 8 illustrates the strap in a second engaged configuration around an object (not shown) wherein the section 62 is pulled through the ring 40, not folded back but attached to the fabric section 53 using a hook and loop engagement (VELCRO) when pressed together.

In either configuration the presence of the elastic elements 66, 68 allow a resilient stretching of the strap to prevent loosening of the strap due to vibration for example. The elastic element 66, 68 allow the strap to be pulled tight and remain tightly engaged around one or more objects.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A strap comprising:
   a strap body comprising a first inelastic strap section, a second inelastic strap section and an elastic strap section connected to the first inelastic strap section at one end and to the second inelastic strap section at an opposite end;
   first and second connectors engageable to hold the strap body in a loop configuration to secure an object therein;
   wherein the elastic section comprises two spaced-apart elastic cords, providing a gap between the cords, each cord secured at opposite ends to the first inelastic strap section and to the second inelastic strap section; and
   a ring connected to an end of the first inelastic strap section and sized to allow a pull through of the second inelastic strap section and the elastic strap section.

2. The strap according to claim 1, wherein the first and second inelastic strap sections are flat, multi-ply strap sections, and each cord is stitched or otherwise secured at opposite ends to the respective first and second inelastic strap sections.

3. The strap according to claim 2, wherein the elastic cords are composed of woven, flattened elastic cord material.

4. The strap according to claim 1, wherein the first and second connectors comprise a hook and loop connection arrangement.

5. The strap according to claim 1, wherein the elastic strap section has a length shorter than either of the first and second inelastic strap sections.

6. A hold down strap for securing two objects together, comprising:
   a strap body comprising a first inelastic strap section, an elastic strap section, and a second inelastic strap section connected together in order, end-to-end-to-end; and a first hook and loop surface applied to the first inelastic strap section and a second hook and loop surface applied to the second inelastic strap section, said first and second hook and loop surfaces engageable together to hold the strap body in a loop configuration to wrap two objects together thereby;
   wherein the elastic section comprises two spaced-apart elastic cords, providing a gap between the cords, each cord secured at opposite ends to the respective first and second inelastic strap sections.

7. The strap according to claim 6, wherein an end of a first inelastic strap section includes a ring that is sized to allow the second inelastic strap section and the elastic section to fit therethrough.

8. The strap according to claim 7, wherein the first and second inelastic strap sections are flat, multi-ply strap sections, and each cord is stitched or otherwise secured at opposite ends to the respective first and second inelastic strap sections.

9. The strap according to claim 8, wherein the elastic cords are composed of woven, flattened elastic cord material.

10. The strap according to claim 6, wherein the elastic strap section has a length shorter than either of the first and second inelastic strap sections.

* * * * *